April 27, 1943. N. J. PETERS 2,317,480
PASTEURIZER TEMPERATURE CONTROL
Filed Oct. 9, 1940
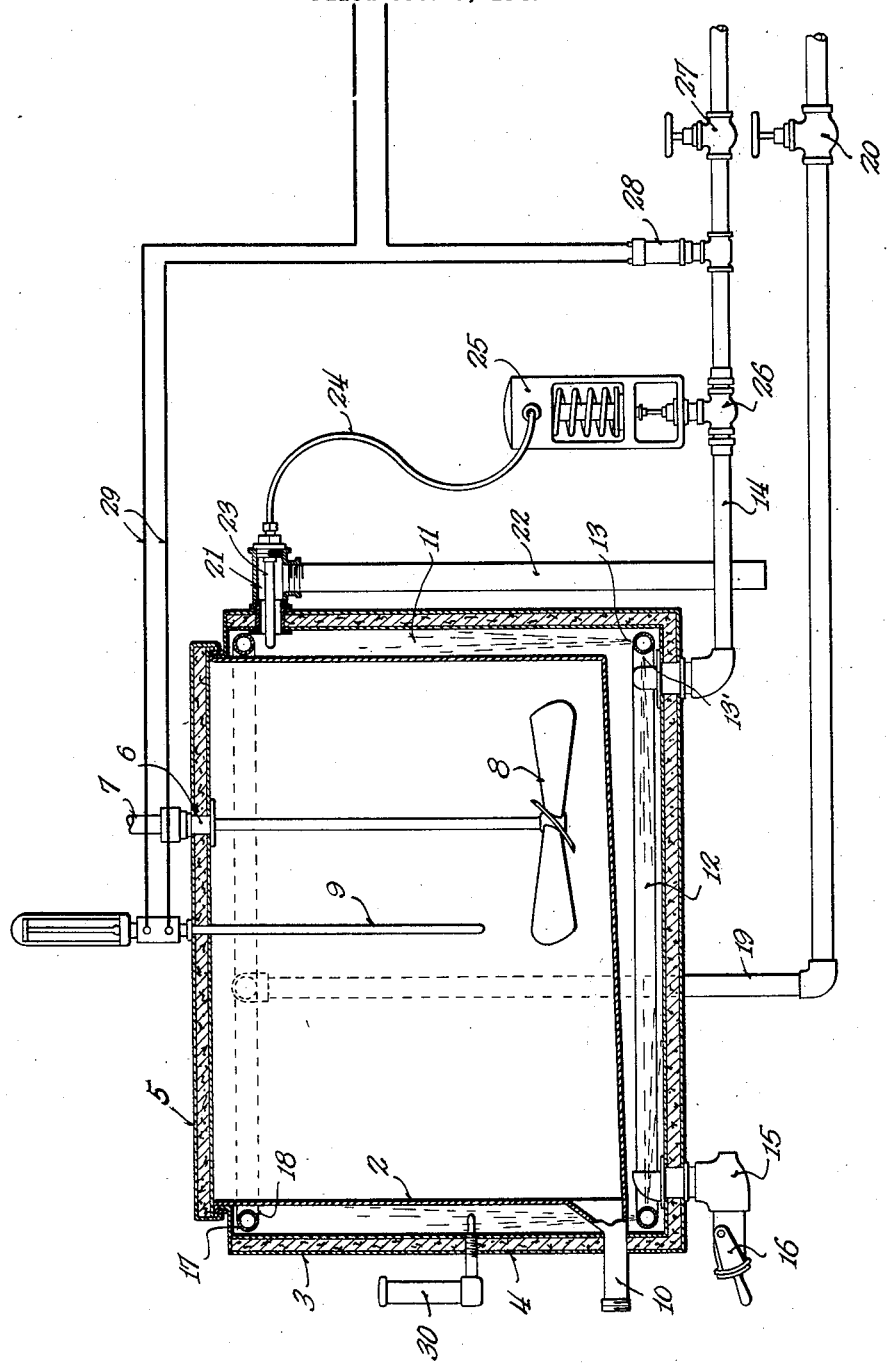
INVENTOR.
Norman J. Peters
BY
Charles & French
ATTORNEYS Patented Apr. 27, 1943

2,317,480

UNITED STATES PATENT OFFICE 2,317,480

PASTEURIZER TEMPERATURE CONTROL

Norman J. Peters, Fond du Lac, Wis., assignor to Damrow Brothers Company, Fond du Lac, Wis., a corporation of Wisconsin Application October 9, 1940, Serial No. 360,363

2 Claims. (Cl. 257—2)

The invention relates to temperature control apparatus for pasteurizers and the like and more particularly to a simple and improved arrangement of control devices for controlling the heating of a body of milk to the desired pasteurizing temperature and the holding of this heated milk at this temperature for the desired length of time.

The general object of the invention is to provide a pasteurizer in which the milk is subjected to as low a temperature as possible under constant agitation so as to prevent its taking on a burnt flavor and heating it as quickly as possible with as little steam as possible. These objects are realized in the present apparatus, and one of the features that contributes to the obtaining of the desired result is the arrangement of the thermosensitive bulb controlling the steam supply to the jacket in the vapor space of the jacket, so that the response of the regulator is only to vapor temperature, and as a consequence, there is no danger of discharging excess steam from the jacket, and all the steam or as much as possible will be utilized in the jacket, and there is less danger of overheating because of the lower temperature in the jacket, inasmuch as the heating system is open all the time and no pressure is built up in the jacket. Under these conditions of heating with proper agitation of the milk the same is heated to the desired temperature, and then the supply of heating medium is automatically shut off.

The invention further consists in the several features hereinafter set forth and more particularly defined by claims at the conclusion hereof.

The drawing shows a pasteurizer and its control arrangement embodying the invention.

Referring to the drawing, the pasteurizer includes an inner, preferably cylindrical, container 2 for the milk or other product to be treated, and 3 an outer, preferably cylindrical, container in which the inner container is mounted and provided with a thermally insulated wall 4. The top 5 of the inner container 2 is shown as provided with an opening 6 for the shaft 7 of an agitator 8. The shaft 7 is usually supported and driven by an electric motor (not shown). A recording thermometer 9 is mounted on the top 5 with its bulb depending downwardly into the liquid contents of the container 2 which has a drain outlet 10 leading from its bottom.

The inner container 2 is spaced from the sides and bottom of the outer container 3, and the space 11 thus formed is adapted to be charged with steam vapor in any suitable manner. As herein shown, a steam pipe ring 12 is mounted in this space and provided with a series of jet holes 13 and 13' which direct the steam upwardly and laterally, respectively, along the sides of the outer container and preferably so that the steam does not strike the inner container 2 directly. The ring 12 connects with a steam supply pipe 14. A drain 15 for the condensate conducts the same from the bottom of the outer container. This drain passage may be provided with a manually controlled valve 16. A cooling pipe ring 17 is mounted at the upper part of the jacket space and provided with jet holes 18 to direct cooling water downwardly against the sides of the inner container, said ring being connected to a water supply pipe 19 provided with a manually controlled shut off valve 20.

The jacket space 11 is provided with an atmospheric vent 21 which, as shown, includes a depending pipe portion 22, this vent passage preventing at all times the building up of steam pressure in said jacket.

For controlling the supply of steam to the jacket space 11 a thermo-sensitive bulb 23 is mounted in said space and is here shown mounted at the upper end of vent 21 and having its hollow interior connected by a pipe 24 with an expansible bellows type valve regular 25 which operates on a regulating valve 26, the details of the valve and its regulator being well known and, therefore, not shown or described, as any suitable form of heat sensitive regulating valve may be used in connection with the present invention so long as, through differences in temperature in the jacket space 11, the valve 26 is opened or closed to let in or cut off the supply of steam to the ring 12, depending upon when the jacket space 11 is cold or hot, it being noted, however, that the bulb 23 responds to the temperature of the steam vapor in the jacket. With this control when the manually operated valve 27 in the supply pipe 14 is opened, the valve 26 will be wide open while the bulb 23 is cold. After a certain time of full passage of steam in the steam ring 12 and its discharge therefrom into the jacket space 11 and the venting out of air from said space through the vent 21, the jacket finally comes up to temperature and the regulator bulb gets warmer and begins to regulate the temperature regulator, gradually closing it down to hold whatever temperature is desired in the jacket or jacket space 11. When the milk in the inner container is up to temperature, the steam can be shut off manually by operating the valve 27 but is preferably shut off automatically by providing an electric type thermometer 9 which controls the operation of an electromagnetically operated steam shut off valve 28 located in the supply pipe 14 ahead of the regulator valve 26. This thermometer can be any suitable electric type thermometer, either the indicating form with a switch mechanism operated by a separate vapor system on the back, or a recording thermometer whereby the recorder needle makes or breaks an electric contact, either of said switch mechanisms being connected through conductor wires 29 with the supply line and with the energizing coil of the valve 28.

From the above description, it will be noted that the bulb 23 is at all times in the steam vapor space, so that the response of the regulator is only to this vapor temperature, and as a result there is no danger of discharging excess steam from the jacket, and all the steam or as much as possible will be utilized in the jacket. There is also less danger of overheating the milk in the inner container because of the lower temperature for the jacket, inasmuch as the system is open all the time and practically no pressure is built up in the jacket space. The operation of the agitator 8 acts to take the heat from the walls of the inner container as fast as possible and transit it to the body of the milk, and thus give as quick a condensation of the steam on said walls as possible, the condensate finding its way out the drain passage 15. The additional control of the steam by the thermo-responsive operated shut off valve 28 actuated in response to the actual temperature of the milk in the inner container insures that the body of the milk will not be overheated. It might be mentioned that when the pasteurizer is first heated, the milk or product in the tank being cold, agitated over the surface, the steam condenses quickly on the outside of the inner tank and runs down in a heavy film. Because the heat is taken quickly through the heating surface by reason of the proper agitation, there is almost a heavy film of water running down the outside of the inner container. The condensate which is drawn from the jacket space is drawn through the drain 15 with the gate or valve 16 slightly open. The regulator valve 25 is so set as to hold the desired temperature in the jacket, which can be noticed on the front thermometer 30, usually held around 160° when the milk is pasteurized to 143° F. With the proper setting there is practically no vapor discharging from the bottom of the vent pipe 22, occasionally just a slight cloud of steam, showing that all the steam is being utilized.

I desire it to be understood that this invention is not to be limited to any of the details of construction of the regulator parts above described, but consists in the novel arrangement of such regulator parts with a steam heated pasteurizer as hereinafter set forth in the claims.

What I claim as my invention is:

1. The combination of inner and outer containers spaced apart to form a space for a heating medium having an open atmospheric vent passage, means for introducing steam into said space as a vapor to heat the walls of the inner container so as to bring the contents thereof to a pasteurizing temperature, thermo-responsive means responsive only to the vapor temperature of the steam in said space for regulating the amount of steam introduced into said space, and means, controlled by the temperature of the liquid being treated, for automatically shutting off the supply of steam to said space when the temperature of the liquid being treated reaches a predetermined value.

2. The combination of an inner container containing a liquid, an outer container spaced from said inner container to form a space for a heating medium, means for introducing steam into said space as a vapor to heat the walls of the inner container so as to bring liquid therein to a pasteurizing temperature, said outer container having a vent passage above the level of any condensate that might collect in said space and through which steam vapor from said heating space is free to pass to atmosphere, a thermo-responsive member disposed in said vent passage in the path of vapor flowing therethrough, and a regulating valve for the supply of steam to said chamber operatively connected to said thermo-responsive member.

NORMAN J. PETERS.